Dec. 11, 1951  R. ASHWORTH  2,578,218
ATTACHMENT OF SOLES TO FOOTWEAR
Filed June 14, 1949

Inventor
Rawden Ashworth.
By Ferdinand Broster Bosshardt
Attorney

Patented Dec. 11, 1951

2,578,218

UNITED STATES PATENT OFFICE 2,578,218

ATTACHMENT OF SOLES TO FOOTWEAR

Rawden Ashworth, Greenmount, near Bury, England

Application June 14, 1949, Serial No. 99,599
In Great Britain August 21, 1948

4 Claims. (Cl. 36—14)

This invention relates to that kind of footwear which has a leather, fabric, straw, plastic or other upper or an upper and an insole, or an upper and an insole and a platform, or a welt attached by sewing stapling and/or riveting to a sole.

One object of the said invention is to provide a process of production of footwear which enables soles of sponge rubber compound or a similarly heat expansible plastic or other substance or compound to be attached by stitches which securely connect the sole without being exposed to wear and to moisture or other causes of rotting.

Another object is to provide footwear having a sole composed of sponge rubber compound or of plastic or other substance or compound which is connected by stitches embedded in the sole by expansion of the sole after the stitches have been applied thereto.

According to my invention, a process of production of footwear of the hereinbefore specified kind consists in sewing, stapling and/or riveting to the upper or to the upper and an insole, or to the upper and an insole and platform or to a welt, a sole piece of unvulcanized sponge rubber compound or a similar heat expansible plastic or other substance or compound with stitches, staples and/or rivets which extend to the underside of the said sole piece, then inserting a last in the sole and applying to the said sole piece a mould whose internal cavity allows for expansion of the said sole piece in thickness, and thereupon heating the said sole piece whilst in the mould to produce a vulcanized sponge rubber sole, or a sole of plastic or other substance or compound, whereby the consequent expansion of the compound or plastic or other substance causes it to spread and bury the parts of the stitches, staples and/or rivets which were on the underside of the sole piece and become united over the said parts and thereby embed or immerse the same in the interior of the produced vulcanized sponge rubber or other sole..

A layer or piece of vulcanized rubber or other material may be provided to unite under the applied heat with the underside of the sole produced in the mould and thereby produce a wearing surface of a different material or substance, and/or if desired, of a different colour.

My invention also consists in footwear having an upper or an upper and insole or an upper, insole and platform or a welt attached to a vulcanized sponge rubber or a sole of plastic or other substance with stitches or compound staples or rivets buried in the said sole by expansion in a mould under vulcanizing heat of a piece of stitched, stapled and/or riveted unvulcanized sponge rubber compound converted by the said vulcanization into the sponge rubber sole, or the expansion under heat of a stitched, stapled and/or riveted piece of plastic or other substance into a sole, the sole being with or without a wearing surface of a different material and/or colour.

The upper may be continuous or composed of separate pieces or straps.

The hereinbefore stated objects are attained by the process hereinafter described and the construction hereinafter described with reference to the accompanying drawings, wherein.

In one example of the said process, hereinafter described with reference to the drawings, and upper 1 and an insole 2 are stitched all round to a piece 3 of sheet rubber compound with stitches 4 by Blake stitching, the stitches 4 extending through to the underside of the piece 3. The rubber compound, contains in addition to plastic, unvulcanized rubber, a blowing agent, such as sodium bicarbonate, and vulcanizing ingredients so that it can be converted by vulcanization into vulcanized sponge rubber. Fillers, softeners and so forth may be incorporated in the compound. The piece 3 is approximately the shape and size in plan view of the desired vulcanized sponge rubber sole, but is considerably less thick than the desired sole, for example half as thick.

A last is then inserted in the upper 1 and the said piece is enclosed in a mould whose internal cavity represents the desired vulcanized sponge rubber sole, with or without integral heel. The said piece 3 therefore does not fill the mould.

Figure 1:
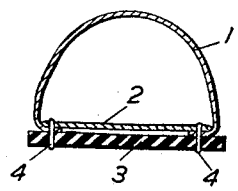
Figure 1 is a detached cross-section of a shoe at a stage of its process of production.
Figure 2:
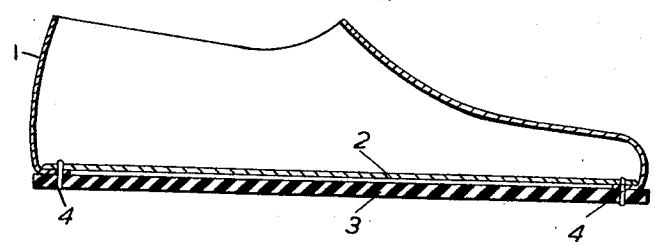
Figure 2 is a detached longitudinal vertical section of the same.
Figure 3:
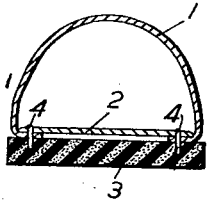
Figure 3 is a detached cross-section of the shoe at the end of its process of production.
Figure 4:
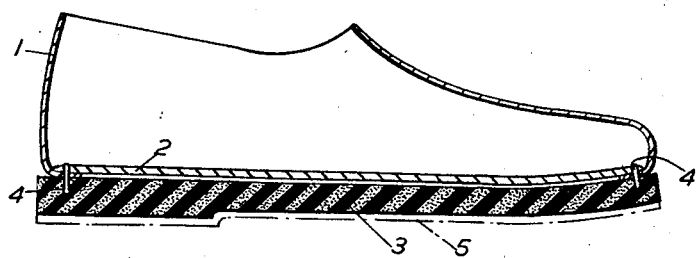
Figure 4 is a detached longitudinal vertical section of the same.

Whilst the piece 3 is in the mould and the upper 1 is on the last, the compound is vulcanized, for example in a steam or electric heated platen press. The resultant blowing and expansion of the compound causes the mould cavity to be completely filled with the compound to form a complete vulcanized sponge rubber sole, with, for example, an integral heel as shown in Figures 3 and 4. The stitches 4 however do not stretch.

Therefore the parts of the stitches 4 which were present on the underside of the piece 3 before vulcanization and swelling become completely submerged or buried in the compound. The result is that without further operations, there is produced a complete and finished vulcanized sponge rubber sole attached to an upper and insole by stitches whose lowest parts are completely embedded or buried in the sole, there being a substantial thickness of sponge rubber between them and the underside of the said sole.

By making the mould cavity sufficiently large to accommodate a layer or piece of other material or substance, and/or of another colour, for example a piece of vulcanized rubber, and placing the layer or piece on the floor of the mould cavity before the piece 3 is inserted therein, the said piece or layer becomes united to the under surface of the piece 3 under the action of the heat and therefore forms a wearing surface, for example as indicated in Figures 3 and 4 wherein a united layer or piece is indicated by dot-and-dash lines and designated by the reference numeral 5.

Staples or rivets may be employed in addition to or instead of stitches 4 to secure the piece 3 to the other parts or part, which may consist of an upper, or an upper and insole, or an upper, insole and platform, or a welt.

Furthermore the invention is not limited to the application of the process to the production of footwear with sponge rubber soles, as a piece of plastic or any other suitable substance, compounded or otherwise, and capable of being stitched, stapled and/or riveted and of permanent expansion and/or blowing under the action of heat may be employed in the process in place of the unvulcanized rubber compound.

I claim:

1. A process of production of footwear, comprising the furnishing of an upper and insole structure with a unitary sole, by permanently attaching to at least one component part of said structure a non-expanded sole piece composed of an unvulcanized sponge rubber compound by stitches which are not materially expandable by heat and have parts which extend on to the underside of the sole piece, inserting a last into the footwear to prevent upward expansion of the sole, confining the sole piece in a space which is greater than the sole piece in thickness in a manner to permit the sole piece to expand downwardly and laterally only and heating the sole piece for converting it into a vulcanized, unitary sponge rubber sole and making it expand downwardly and laterally and thereby bury and completely enclose in its interior those parts of the stitches which were present on the underside of the piece of unvulcanized sponge rubber compound.

2. An article of footwear comprising an upper having its lower portions in direct contact with a unitary, multicellular, one-piece sole having its peripheral edge of uniform nature throughout, said sole being attached directly to the upper of the footwear by stitching which passes vertically through said lower portions of the upper and extends only partly through the sole, and is disposed inwardly of the sole, the said sole having an imperforate integral wear surface completely overlying the stitching.

3. An article of footwear comprising an upper having a lower inturned marginal portion in direct contact with a unitary multi-cellular, one-piece sole having its peripheral edge of uniform nature throughout, said sole being attached directly to the marginal portion of the upper by stitching which passes vertically through said marginal portion of the upper and extends only partly through the sole, and is disposed inwardly of the peripheral edge of the sole, the said sole having an imperforate integral wear surface completely overlying the stitching.

4. The combination of claim 3, wherein an insole is provided and the stitching passes through the insole to affix the insole to the inside of the marginal portion of the upper.

RAWDEN ASHWORTH.

REFERENCES CITED

The following references are of record in the file of this patent:

UNITED STATES PATENTS

| Number | Name | Date |
|---|---|---|
| 542,175 | Sharpe | July 2, 1895 |
| 1,137,159 | Myer | Apr. 27, 1915 |
| 1,584,626 | MacPherson | May 11, 1926 |
| 1,672,653 | Oakley | June 5, 1928 |
| 1,955,720 | Rollmann | Apr. 17, 1934 |
| 1,989,853 | Finn | Feb. 2, 1935 |
| 2,129,106 | Szerenyi | Sept. 6, 1938 |
| 2,437,030 | Hoza | Mar. 2, 1948 |

FOREIGN PATENTS

| Number | Country | Date |
|---|---|---|
| 200,383 | Great Britain | July 12, 1923 |
| 537,561 | Great Britain | June 26, 1941 |
| 550,443 | Great Britain | Jan. 7, 1943 |
| 668,945 | France | July 23, 1929 |